US011948581B2

(12) United States Patent
Tseng et al.

(10) Patent No.: US 11,948,581 B2
(45) Date of Patent: *Apr. 2, 2024

(54) SMART INTERPRETER ENGINE AND ELECTRONIC SYSTEM

(71) Applicant: ACER INCORPORATED, New Taipei (TW)

(72) Inventors: Gianna Tseng, New Taipei (TW); Shih-Cheng Huang, New Taipei (TW); Shang-Yao Lin, New Taipei (TW); Szu-Ting Chou, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 58 days.

This patent is subject to a terminal disclaimer.

(21) Appl. No.: 17/746,986

(22) Filed: May 18, 2022

(65) Prior Publication Data

US 2022/0277751 A1    Sep. 1, 2022

Related U.S. Application Data

(63) Continuation of application No. 16/884,021, filed on May 26, 2020, now Pat. No. 11,482,229, which is a (Continued)

(30) Foreign Application Priority Data

Aug. 28, 2018  (TW) .................................. 107129912

(51) Int. Cl.
*G10L 15/20* (2006.01)
*G06F 40/58* (2020.01)
(Continued)

(52) U.S. Cl.
CPC .............. *G10L 17/00* (2013.01); *G06F 40/58* (2020.01); *G10L 13/086* (2013.01);
(Continued)

(58) Field of Classification Search
CPC ....... G10L 15/26; G10L 15/005; G10L 13/00; G10L 13/04; G10L 15/06; G10L 15/22;
(Continued)

(56) References Cited

U.S. PATENT DOCUMENTS 6,006,175 A * 12/1999 Holzrichter .......... A61B 5/0507
704/E15.041
8,566,078 B2 * 10/2013 Sarikaya ................. G06F 40/40
704/277

(Continued)

FOREIGN PATENT DOCUMENTS

AU      2017100557 A4    6/2017
CN       101189659 A    5/2008
(Continued)

*Primary Examiner* — Vijay B Chawan
(74) *Attorney, Agent, or Firm* — Winston Hsu

(57) ABSTRACT

A smart interpreter engine is provided. The smart interpreter engine includes a speech to text converter, a natural language processing module and a translator. The speech to text converter is utilized for converting speech data corresponding to a first language into text data corresponding to the first language. The natural language processing module is utilized for converting the text data corresponding to the first language into glossary text data corresponding to the first language according to a game software. The translator is utilized for converting the glossary text data corresponding to the first language into text data corresponding to a second language.

19 Claims, 7 Drawing Sheets

Related U.S. Application Data continuation of application No. 16/200,556, filed on Nov. 26, 2018, now Pat. No. 10,706,855.

(51) Int. Cl.
| | | |
|---|---|---|
| *G10L 13/08* | (2013.01) | |
| *G10L 15/00* | (2013.01) | |
| *G10L 15/16* | (2006.01) | |
| *G10L 17/00* | (2013.01) | |
| *G10L 17/02* | (2013.01) | |
| *G10L 17/18* | (2013.01) | |

(52) U.S. Cl.
CPC ............ *G10L 15/005* (2013.01); *G10L 15/16* (2013.01); *G10L 15/20* (2013.01); *G10L 17/02* (2013.01); *G10L 17/18* (2013.01)

(58) Field of Classification Search
CPC ....... G10L 17/26; G06F 40/58; G06F 40/253; G06F 40/47; G06F 40/279; G06F 40/40; G06F 40/42; G06F 40/44; G06F 9/454; G06F 9/453; G06F 3/167; H04N 31/439; H04N 21/482; H04N 21/4856; G09B 19/06; G07F 17/32; G07F 17/3209; H04M 2201/40; H04M 2203/2061; H04M 2250/58

See application file for complete search history.

(56) References Cited

U.S. PATENT DOCUMENTS

| | | | |
|---|---|---|---|
| 8,825,468 B2 | 9/2014 | Jacobsen | |
| 9,794,613 B2* | 10/2017 | Jang | ................ H04N 21/42203 |
| 10,009,645 B2* | 6/2018 | Jang | .................... H04N 21/4821 |
| 10,417,349 B2 | 9/2019 | Lewis | |
| 10,706,855 B2* | 7/2020 | Tseng | .................... G10L 13/086 |
| 11,482,229 B2* | 10/2022 | Tseng | ...................... G10L 15/16 |
| 2009/0099836 A1 | 4/2009 | Jacobsen | |
| 2013/0024197 A1* | 1/2013 | Jang | .................... H04N 21/4821 |
| | | | 704/E15.001 |
| 2013/0073293 A1* | 3/2013 | Jang | ........................ G10L 15/22 |
| | | | 704/E21.001 |
| 2013/0289971 A1* | 10/2013 | Parkinson | ............... G06F 40/58 |
| | | | 704/2 |
| 2014/0147816 A1* | 5/2014 | Ferro | ..................... G09B 5/065 |
| | | | 434/157 |
| 2014/0324422 A1* | 10/2014 | Winarski | ............. H04N 21/439 |
| | | | 704/235 |
| 2016/0162477 A1* | 6/2016 | Orsini | ................... H04L 51/212 |
| | | | 704/2 |
| 2018/0286400 A1 | 10/2018 | Seo | |
| 2018/0293220 A1* | 10/2018 | Lee | ........................ G06F 3/0488 |
| 2018/0315427 A1* | 11/2018 | Kwon | ................ G10L 15/1815 |
| 2018/0374482 A1* | 12/2018 | Woo | ........................ G10L 15/22 |
| 2019/0340190 A1 | 11/2019 | Ganteaume | |
| 2019/0354592 A1 | 11/2019 | Musham | |

FOREIGN PATENT DOCUMENTS

| | | |
|---|---|---|
| CN | 104303177 A | 1/2015 |
| CN | 105393302 A | 3/2016 |
| CN | 105531758 A | 4/2016 |
| CN | 107115668 A | 9/2017 |
| CN | 206863740 U | 1/2018 |
| CN | 108196814 A | 6/2018 |
| TW | 201346597 A | 11/2013 |
| TW | M553001 U | 12/2017 |
| TW | M563122 U | 7/2018 |

* cited by examiner

SMART INTERPRETER ENGINE AND ELECTRONIC SYSTEM

CROSS REFERENCE TO RELATED APPLICATIONS

This application is a continuation application of U.S. application Ser. No. 16/884,021, filed on May 26, 2020, which is a continuation application of U.S. application Ser. No. 16/200,556, filed on Nov. 26, 2018. The contents of these applications are incorporated herein by reference.

BACKGROUND OF THE INVENTION

1. Field of the Invention

The present invention relates to a smart interpreter engine and an electronic system, and more particularly, to a smart interpreter engine and electronic system capable of acquiring audio data in game for neural machine translation.

2. Description of the Prior Art

With development of technology and improvement of people's living standard, people are more closely connected with to computer systems. People frequently use computer systems whether they are at home or at work. Recently, computer systems play an important role in video game industry. For example, a gaming computer is designed for playing games. A good interaction between players in the same team is very important. However, the poor communication or communication difficulty may easy occur between players who using different languages, and thus resulting in poor records. Thus, the prior art has to be improved.

SUMMARY OF THE INVENTION

It is therefore a primary objective of the present invention to provide a smart interpreter engine and an electronic system capable of acquiring audio data in game for neural machine translation, to solve the above-mentioned problem.

According to an embodiment of the present invention, an exemplary smart interpreter engine is disclosed. The exemplary smart interpreter engine comprises a speech to text converter for converting speech data corresponding to a first language into text data corresponding to the first language; a natural language processing module for converting the text data corresponding to the first language into glossary text data corresponding to the first language according to a game software being executed in a host; and a translator for converting the glossary text data corresponding to the first language into text data corresponding to a second language.

According to an embodiment of the present invention, an exemplary electronic system is disclosed. The exemplary electronic system comprises a host for obtaining speech data corresponding to a first language; and a smart interpreter engine, comprising: a speech to text converter for converting the speech data corresponding to the first language into text data corresponding to the first language; a natural language processing module for converting the text data corresponding to the first language into glossary text data corresponding to the first language according to a game software being executed in the host; and a translator for converting the glossary text data corresponding to the first language into text data corresponding to a second language.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
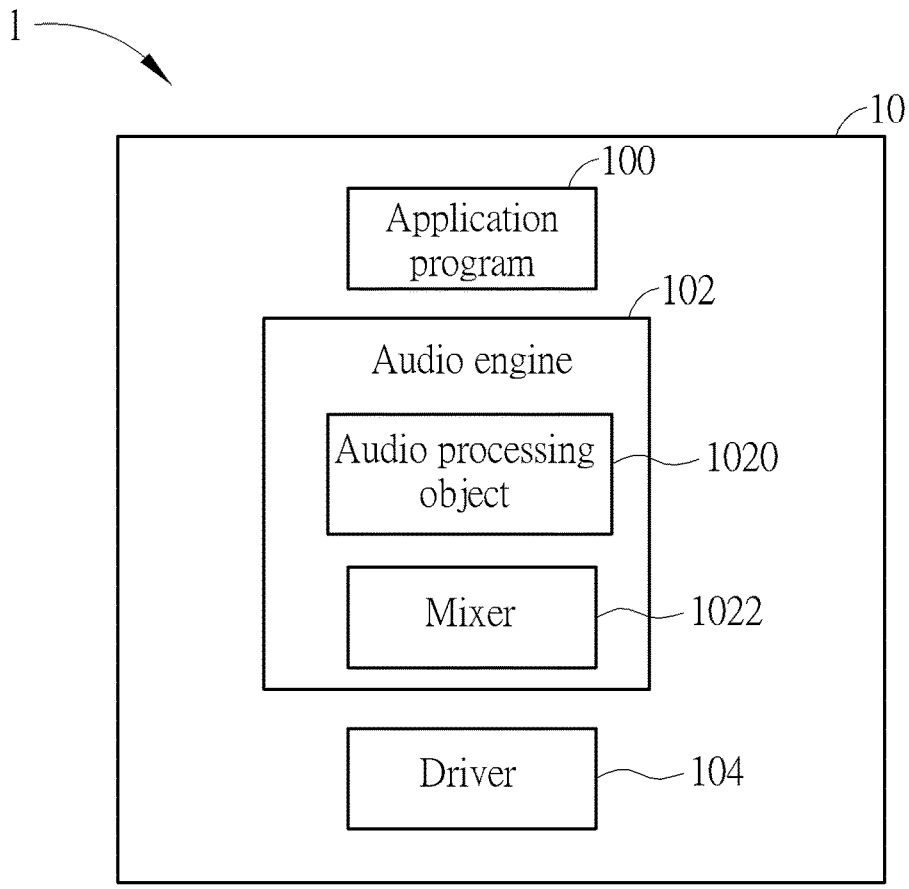
FIG. 1 is a schematic diagram illustrating an electronic system according to an embodiment of the present invention.
Figure 1:
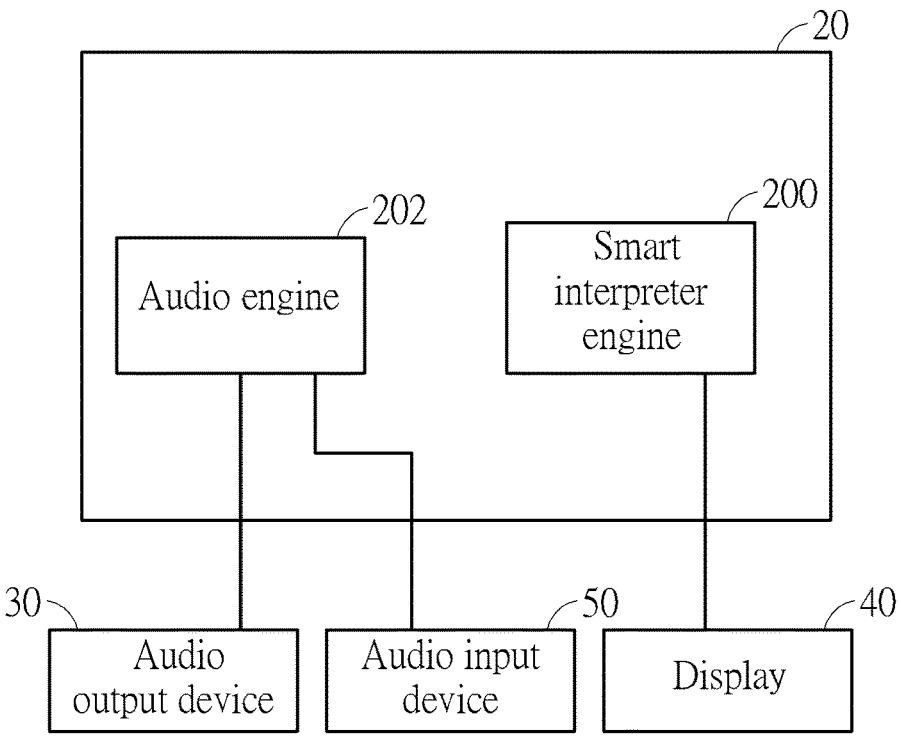

Please refer to FIG. 1, which is a schematic diagram illustrating an electronic system 1 according to an embodiment of the present invention. The electronic system 1 includes a host 10, a multimedia processing circuit 20, an audio output device 30, a display 40 and an audio input device 50. The host 10 can be a desktop computer, a notebook, a mobile communication device, but not limited thereto. The host 10 and the multimedia processing circuit 20 are two independent devices. The host 10 and multimedia processing circuit 20 are independent and separate from each other. The host 10 is connected to the multimedia processing circuit 20 through a wireless or wired connection. The host 10 includes an application program 100, an audio engine 102 and a driver 104. The application program 100 is stored in a storage device (not shown in figures) of the host 10 and executed by a processing circuit (not shown in figures) of the host 10. The application program 100 is configured to process audio streams. The audio streams correspond to a first language. Audio data of the audio streams may be classified into a plurality of audio (sound) categories. The audio engine 102 acquires a first a first sound type of audio data from the audio streams processing by the application program 100 as speech data corresponding to a first language. The driver 104 outputs the speech data corresponding to the first language and acquired by the audio engine 102 to the multimedia processing circuit 20. For example, the driver 104 transmits the speech data corresponding to the first language to the multimedia processing circuit 20 through a transmission interface (e.g., universal serial bus (USB) interface).

The multimedia processing circuit 20 can be a system on a chip (SOC), but not limited thereto. The multimedia processing circuit 20 includes a smart interpreter engine 200 and an audio engine 202. The smart interpreter engine 200 can convert the speech data corresponding to a first language into text data corresponding to a second language. The audio engine 202 can convert the speech data corresponding to the first language into an analog speech signal corresponding to the first language. The audio output device 30 is utilized for playing the analog speech signal corresponding to the first language. The audio output device 30 can be a headphone or a speaker, but not limited thereto. The display 40 is utilized for displaying the text data corresponding to the second language. The audio input device 50 is utilized for acquiring sound of the current environment to generate an audio signal corresponding to a first language. The audio input device 50 can be a microphone, but not limited thereto. The audio output device 30, the display 40 and the audio input device 50 can be connected to the multimedia processing circuit 20 through wireless or wired connections. In addition, the audio output device 30 and the audio input device 50 may be integrated onto a single structural element, such as a headset product.

Figure 2:
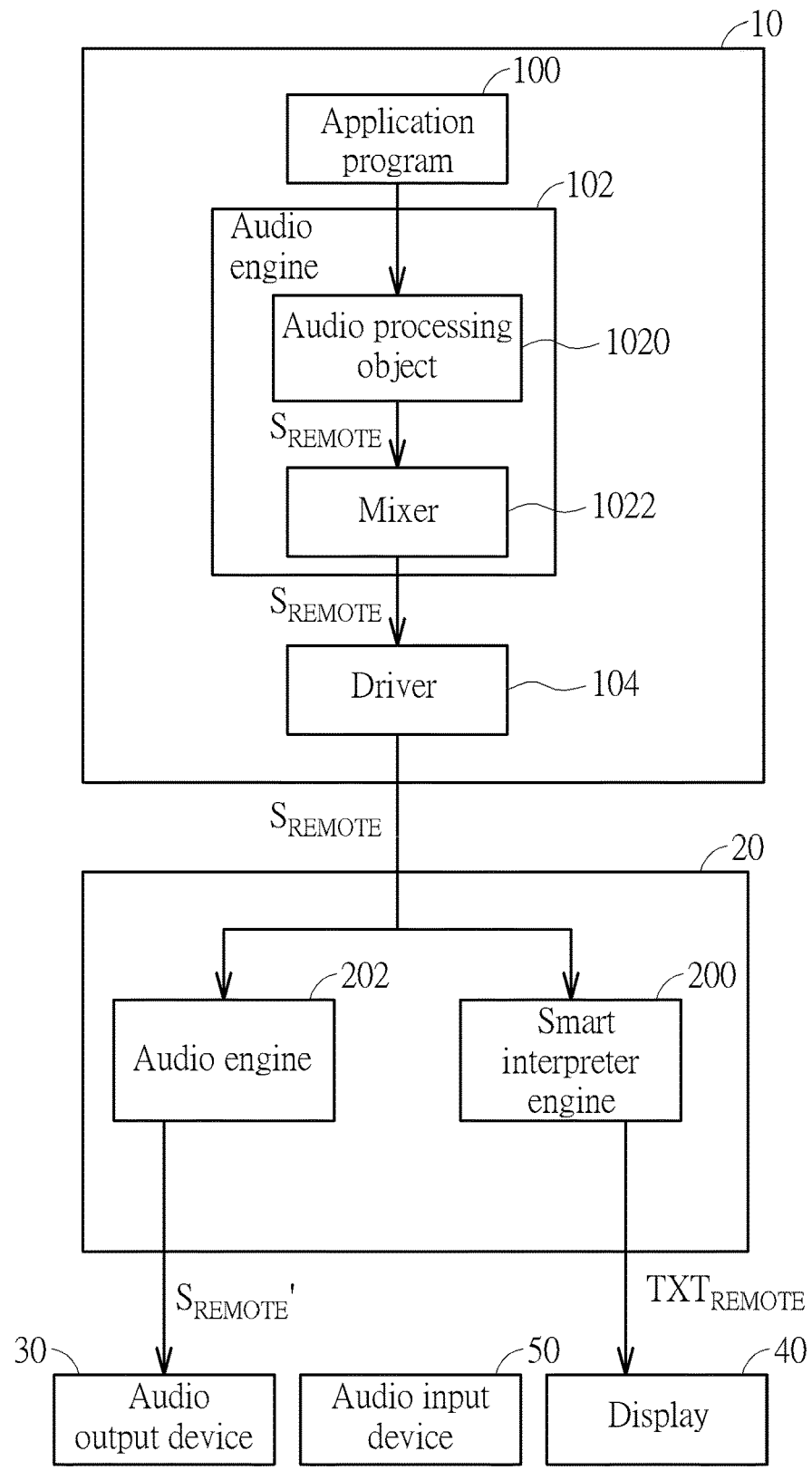
FIG. 2 is a schematic diagram of the electronic system operating in a first operation mode according to an exemplary embodiment of the invention.

Please refer to FIG. 2. FIG. 2 is a schematic diagram of the electronic system 1 operating in a first operation mode (rendering mode) according to an exemplary embodiment of the invention. In the first operation mode (rendering mode), the audio engine 102 acquires a first sound type of audio data from audio streams processed by the application program 100 for acting as speech data $S_{REMOTE}$ corresponding to a first language. The speech data $S_{REMOTE}$ corresponding to the first language can be transmitted to the driver 104. For example, audio (sound) category of Microsoft Windows 10 operating system includes at least the following: movie, media, game chat, speech, communications, alerts, sound effects, game media, game effect, others. Each audio data can be tagged with one of sound categories. The audio engine 102 acquires at least one sound type of audio data from audio streams processed by the application program 100 for acting as speech data $S_{REMOTE}$ corresponding to a first language. In an embodiment, the audio engine 102 acquires all of the audio data tagged as "Game chat" from the audio streams processed by the application program 100 for acting as the speech data $S_{REMOTE}$ corresponding to the first language according to the audio category tagged with the audio data. In an alternative embodiment, the audio engine 102 acquires all of the audio data tagged as any of "Game chat", "communications" and "others" from the audio streams processed by the application program 100 for acting as the speech data $S_{REMOTE}$ corresponding to the first language according to the audio category tagged with the audio data.

Please further refer to FIG. 1 and FIG. 2. The audio engine 102 includes an audio processing object (APO) 1020 and a mixer 1022. For example, if the application program 100 is game software. The APO 1020 includes a stream effect (SFX) APO. As shown in Table 1, the SFX APO can receive audio (sound) data of game from the application program 100 for sound effect processing. For example, the SFX APO can obtain audio data tagged as "game chat" (e.g., player vocal shown in Table 1) for sound effect processing. Before sound effect processing, the APO 1020 can copy the audio data tagged as "game chat", and the copied audio data is utilized as the speech data $S_{REMOTE}$ corresponding to the first language. In other words, the audio engine 102 can utilize the APO 1020 to acquire the required sound type of audio data from the audio streams. In more detail, the audio engine 102 merely acquires the required sound type of audio data from the audio streams without further processing the acquired audio data. Moreover, the speech data $S_{REMOTE}$ corresponding to the first language is transmitted to the mixer 1022. The mixer 1022 outputs the speech data $S_{REMOTE}$ corresponding to the first language to the driver 104.

TABLE 1

| Sound data in game | Background Music (BGM) | Partial sound effect (Punch sound, collision sound . . . etc.) | NPC Sound | Game Environment sound | Player vocal (for communication, live broadcast) |
|---|---|---|---|---|---|
| Audio Stream Category Of Windows 10 operating system | In Game Music | Game Effect | Game Effect | Game Effect | Game Chat |

Further, the speech data $S_{REMOTE}$ corresponding to the first language obtained by the audio engine 102 is transmitted to the driver 104. The driver 104 provides the speech data $S_{REMOTE}$ corresponding to the first language to the smart interpreter engine 200 and the audio engine 202. Since the speech data $S_{REMOTE}$ corresponding to the first language is a digital signal, the audio engine 202 converts the speech data $S_{REMOTE}$ corresponding to the first language into an analog speech signal $S_{REMOTE'}$ corresponding to the first language. The analog speech signal $S_{REMOTE'}$ corresponding to the first language is an analog signal. For example, the audio engine 202 includes a digital to analog converter (not shown in figures). The digital to analog converter can convert the speech data $S_{REMOTE}$ corresponding to the first language into an analog speech signal $S_{REMOTE'}$ corresponding to the first language. The audio engine 202 outputs the analog speech signal $S_{REMOTE'}$ corresponding to the first language to the audio output device 30. The audio output device 30 playbacks the analog speech signal $S_{REMOTE'}$ corresponding to the first language to generate sound to the user. The smart interpreter engine 200 converts the speech data $S_{REMOTE}$ corresponding to the first language into text data $TXT_{REMOTE}$ corresponding to a second language and provides the text data $TXT_{REMOTE}$ corresponding to the second language to the display 40. The display 401 displays the text data $TXT_{REMOTE}$ corresponding to the second language for the user.

For example, if the first language is English and the second language is Chinese. After receiving the speech data $S_{REMOTE}$ in English, the host 10 provides the speech data $S_{REMOTE}$ in English to the multimedia processing circuit 20. The multimedia processing circuit 20 converts the speech data $S_{REMOTE}$ in English into an analog speech data $S_{REMOTE'}$ in English and transmits the analog speech data $S_{REMOTE'}$ in English to the audio output device 30 for playback. Meanwhile, the smart interpreter engine 200 of the multimedia processing circuit 20 converts the speech data $S_{REMOTE}$ in English into text data $TXT_{REMOTE}$ in Chinese, such that the display 40 displays the text data $TXT_{REMOTE}$ in Chinese.

In other words, when a user familiar with English is using the electronic system 1, the user can hear the analog speech data $S_{REMOTE'}$ corresponding to the first language played by the audio output device 30 and see the text data $TXT_{REMOTE}$ displayed by the display 40. Under such a situation, even the user does not understand the analog speech data $S_{REMOTE'}$ corresponding to the first language, the user can understand and perceive what the information conveyed by the speech data $S_{REMOTE}$ corresponding to the first language while seeing the text data $TXT_{REMOTE}$ corresponding to the second language displayed by the display 40.

Figure 3:
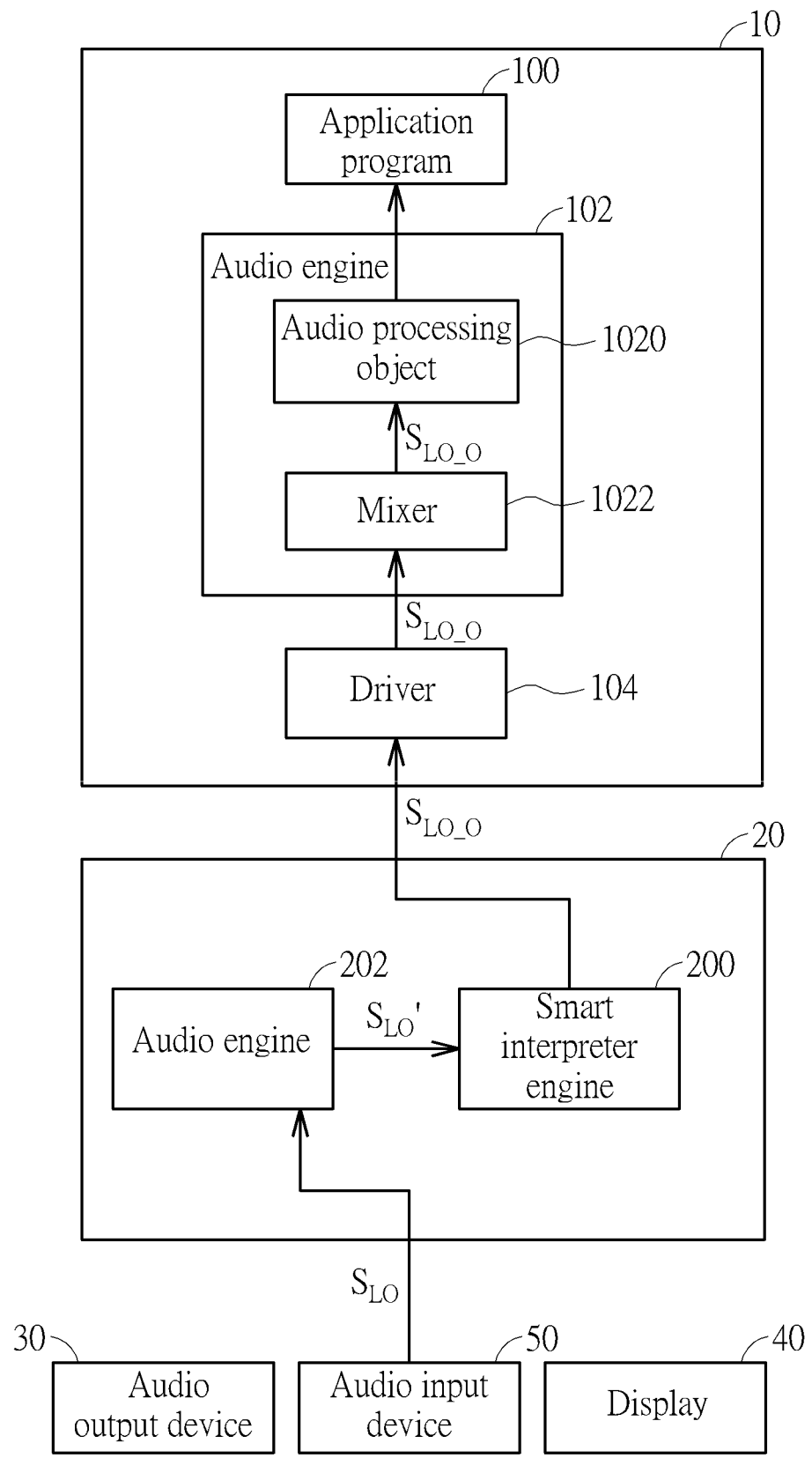
FIG. 3 is a schematic diagram of the electronic system operating in a second operation mode according to an exemplary embodiment of the invention.

Please refer to FIG. 3. FIG. 3 is a schematic diagram of the electronic system 1 operating in a second operation mode (capturing mode) according to an exemplary embodiment of the invention. In the second operation mode (capturing mode), the audio input device 50 acquires sound of the current environment to generate an analog speech signal $S_{LO}$ corresponding to a first language. The analog speech signal $S_{LO}$ corresponding to the first language can be transmitted to the audio engine 202. Since the analog speech signal $S_{LO}$ corresponding to the first language is an analog signal, the audio engine 202 converts the analog speech signal $S_{LO}$ corresponding to the first language into speech data $S_{LO'}$ corresponding to the first language. The speech data $S_{LO'}$ corresponding to the first language is a digital signal. For example, the audio engine 202 includes an analog to digital converter (not shown in figures). The analog to digital converter can convert the analog speech data $S_{LO}$ corresponding to the first language into the speech data $S_{LO'}$ corresponding to the first language. The speech data $S_{LO'}$ corresponding to the first language is transmitted to the smart interpreter engine 200. The smart interpreter engine 200 converts the speech data $S_{LO'}$ corresponding to the first language into speech data $S_{LO\_O}$ corresponding to a second language. In an embodiment, the smart interpreter engine 200 converts the speech data $S_{LO'}$ corresponding to the first language into text data corresponding to the first language and further converts the text data corresponding to the first language into text data corresponding to the second language. Further, the smart interpreter engine 200 converts the text data corresponding to the second language into the speech data $S_{LO\_O}$ corresponding to the second language.

Moreover, the smart interpreter engine 200 transmits the speech data $S_{LO\_O}$ corresponding to the second language to the host 10. The host 10 provides the speech data $S_{LO\_O}$ corresponding to the second language to external devices. For example, the smart interpreter engine 200 transmits the speech data $S_{LO\_O}$ corresponding to the second language to the driver 104. The driver 104 transmits the speech data $S_{LO\_O}$ corresponding to the second language to the audio engine 102. The speech data $S_{LO\_O}$ corresponding to the second language is transmitted to the application program 100 through the APO 1020 and the mixer 1022. The application program 100 provides the speech data $S_{LO\_O}$ corresponding to the second language to the external device. As a result, when a user familiar with the second language is using the external device, the user can understand and perceive the information conveyed by the user of the electronic system 1 when hearing the speech data $S_{LO\_O}$ corresponding to the second language outputted by the electronic system 1.

Figure 4:
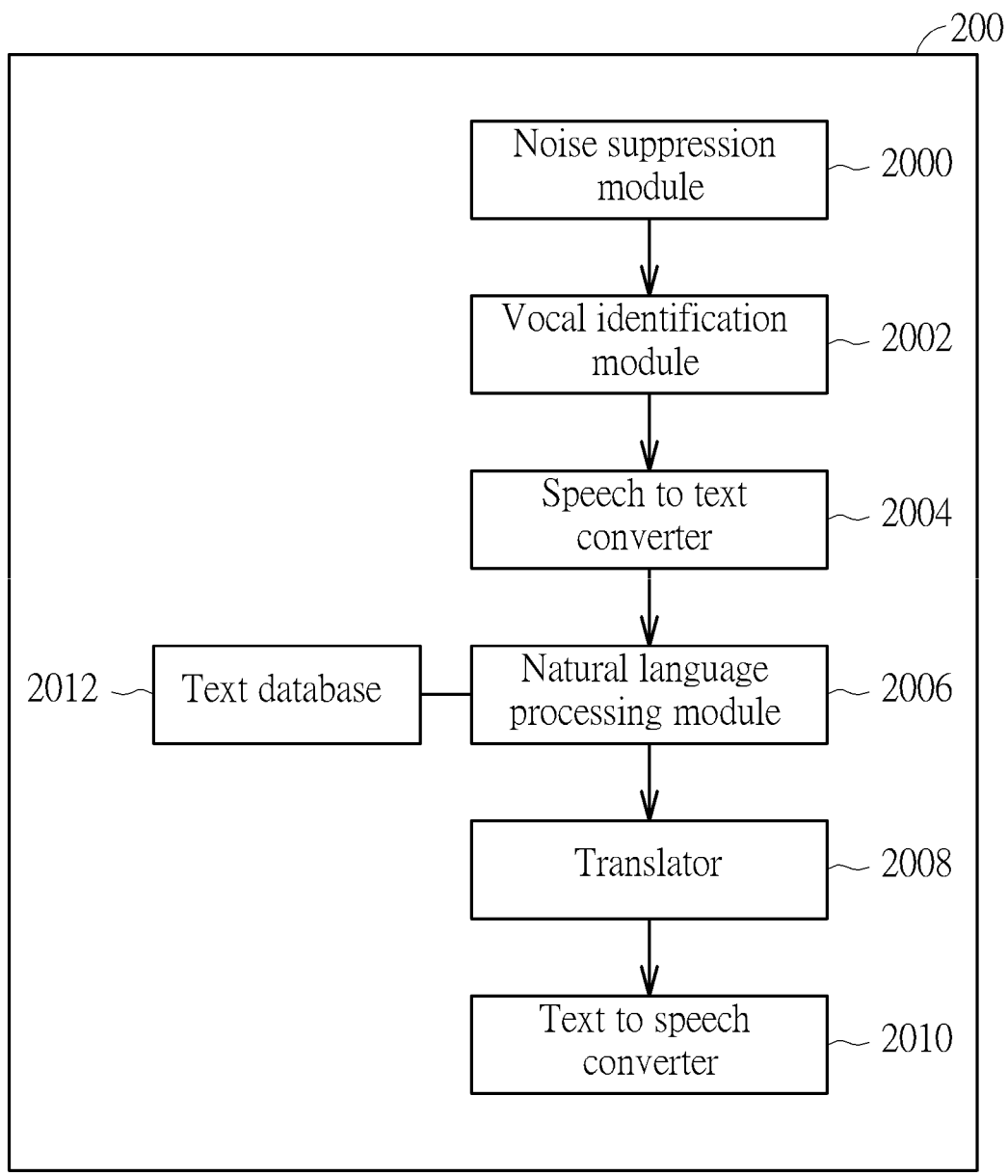
FIG. 4 is a schematic diagram of the he smart interpreter engine shown in FIG. 1 according to an exemplary embodiment of the invention.

Please refer to FIG. 4. FIG. 4 is a schematic diagram of the smart interpreter engine 200 shown in FIG. 1 according to an exemplary embodiment of the invention. The smart interpreter engine 200 includes a noise suppression module 2000, a vocal identification module 2002, a speech to text converter 2004, a natural language processing (NLP) module 2006, a translator 2008, a text to speech converter 2010 and a text database 2012. When the electronic system 1 operates in the first operation mode (capturing mode), the driver 104 of the host 10 transmits the speech data $S_{REMOTE}$ corresponding to the first language to the smart interpreter engine 200 of the multimedia processing circuit 20. The noise suppression module 2000 performs a noise suppression process on the speech data $S_{REMOTE}$ corresponding to the first language for reducing noise component in the speech data. The vocal identification module 2002 performs a vocal identification process on the noise-suppressed speech data $S_{REMOTE}$ corresponding to the first language to generate vocal identification data corresponding to the first language. The vocal identification data is vocal data in the noise-suppressed speech data $S_{REMOTE}$, which is determined as a human voice by the vocal identification module 2002. In addition, if there is no noise suppression requirement, the smart interpreter engine 200 can directly transmit the noise-suppressed speech data $S_{REMOTE}$ to the vocal identification module 2002 for vocal identification processing. The speech to text converter 2004 converts the vocal identification data corresponding to the first language into text data corresponding to the first language. The text data corresponding to the first language may include at least one word.

The NLP module 2006 can convert the text data corresponding to the first language into glossary text data corresponding to the first language. For example, the NLP module 2006 converts the text data corresponding to the first language into glossary text data corresponding to the first language according to the application program 100 being executed in the host 10. The host 10 can inform the smart interpreter engine 200 of information of the application program 100 being executed in the host 10. Besides, the smart interpreter engine 200 can ask the host 10 which application program 100 is executing by the host 10. For example, the NLP module 2006 queries the text database 2012 according to the application program 100 being executed in the host 10 and the text data corresponding to the first language converted by the speech to text converter 2004. The text database 2012 includes a plurality of text samples corresponding to the first language and a plurality of application programs, and a plurality of glossary texts corresponding to the text samples. For example, a first text sample corresponding to the first language and a first application program has corresponding glossary text corresponding to the first language. A second text sample corresponding to the first language and a second application program has corresponding glossary text corresponding to the first language and so on. Each text sample includes at least one word. Each glossary text includes at least one word. As such, the NLP module 2006 can compare the application program 100 being executed in the host 10 and the text data corresponding to the first language with the text samples of the text database 2012, so as to find out the match results and accordingly determine the corresponding glossary text.

When a word of the text data corresponding to the first language matches a first text sample of the plurality of text samples and the application program 100 being executed in the host 10 matches an application program corresponding to the first text sample, the NLP module 2006 converts the word of the text data corresponding to the first language into the glossary text corresponding to the first text sample. When a plurality of words of the text data corresponding to the first language matches a first text sample of the plurality of text samples and the application program 100 being executed in the host 10 matches an application program corresponding to the first text sample, the NLP module 2006 converts the plurality of words of the text data corresponding to the first language into the glossary text corresponding to the first text sample.

Further, the translator 2008 converts the glossary text data corresponding to the first language into text data $TXT_{REMOTE}$ corresponding to a second language. As a result the text data $TXT_{REMOTE}$ corresponding to a second language can be provided to the display 40 for display to the user.

For example, please refer to Table 2. Table 2 illustrates an exemplary embodiment of the text database 2012. Suppose the first language is English and the second language is Chinese. The first application program is League of Legends game software. The second application program is Minecraft game software. The third application program is SimCity game software. The fourth application program is general application program. For example, in this embodiment, the fourth application program can be any application program except the fifth application program. The glossary text corresponding to the fourth application program may be a daily life expression, rather than a glossary text dedicated to a component, a prop or a role in a specific game software. The fifth application program is PUBG (PLAYER UNKNOWN'S BATTLE GROUNDS) game software. If an English word in the text data is "flash" and the application program 100 being executed in the host 10 is the first application program, the NLP module 2006 converts the English word "flash" into a glossary text "flash" of English corresponding to the first application program. The translator 2008 converts the glossary text "flash" of English into Chinese words "閃現" (Chinese characters). If an English word in the text data is "flash" and the application program 100 being executed in the host 10 is the second application program, the NLP module 2006 converts the English word "flash" into a glossary text "accelerator" of English corresponding to the first application program. The translator 2008 converts the glossary text "accelerator" of English into Chinese words "加速器" (Chinese characters). In other words, each application program may apply different glossary texts (i.e. different glossary texts for different application programs). The user can choose different text database (also called language pack) for the smart interpreter engine 200. The multimedia processing 20 can also detect the kind of application program being executed and accordingly switch to the corresponding text database for interpretation.

If an English word in the text data is "feeder" and the application program 100 being executed in the host 10 is the first application program, the NLP module 2006 converts the English word "feeder" into a glossary text "fertilizer" of English corresponding to the first application program. The translator 2008 converts the glossary text "fertilizer" of English into Chinese words "肥料" (Chinese characters). If an English word in the text data is "feeder" and the application program 100 being executed in the host 10 is the second application program, the NLP module 2006 converts the English feeder "flash" into a glossary text "feeder" of English corresponding to the first application program. The translator 2008 converts the glossary text "feeder" of English into Chinese words "餵養者" (Chinese characters) and the like.

TABLE 2

| text data corresponding to first language | application program | glossary text corresponding to first language | meanings of glossary text corresponding to first language | text corresponding to second language after translated |
|---|---|---|---|---|
| Flash | first application program | Flash | a skill from Summoner that quick moves from A place to B place | 閃現 ("shan hsien" in Romanized form) |
| | second application program | Accelerator | an accelerator for character motion | 加速器 ("chia su chi" in Romanized form) |
| Feeder | first application program | Fertilizer | the player control a NPC always play quick dead | 肥料 ("fei liao" in Romanized form) |
| | third application program | Feeder | the man in the farm and job is feeding livestock | 餵養者 ("wei yang che" in Romanized form) |
| Chicken Dinner | fourth application program | Eat chicken | cooked chicken and be the dinner | 吃雞 ("chih chi" in Romanized form) |
| | fifth application program | Win | "WINER, WINER, CHICKEN DINNER" means the won side of the battle or play game | 勝利 ("sheng li" in Romanized form) |

Figure 5:
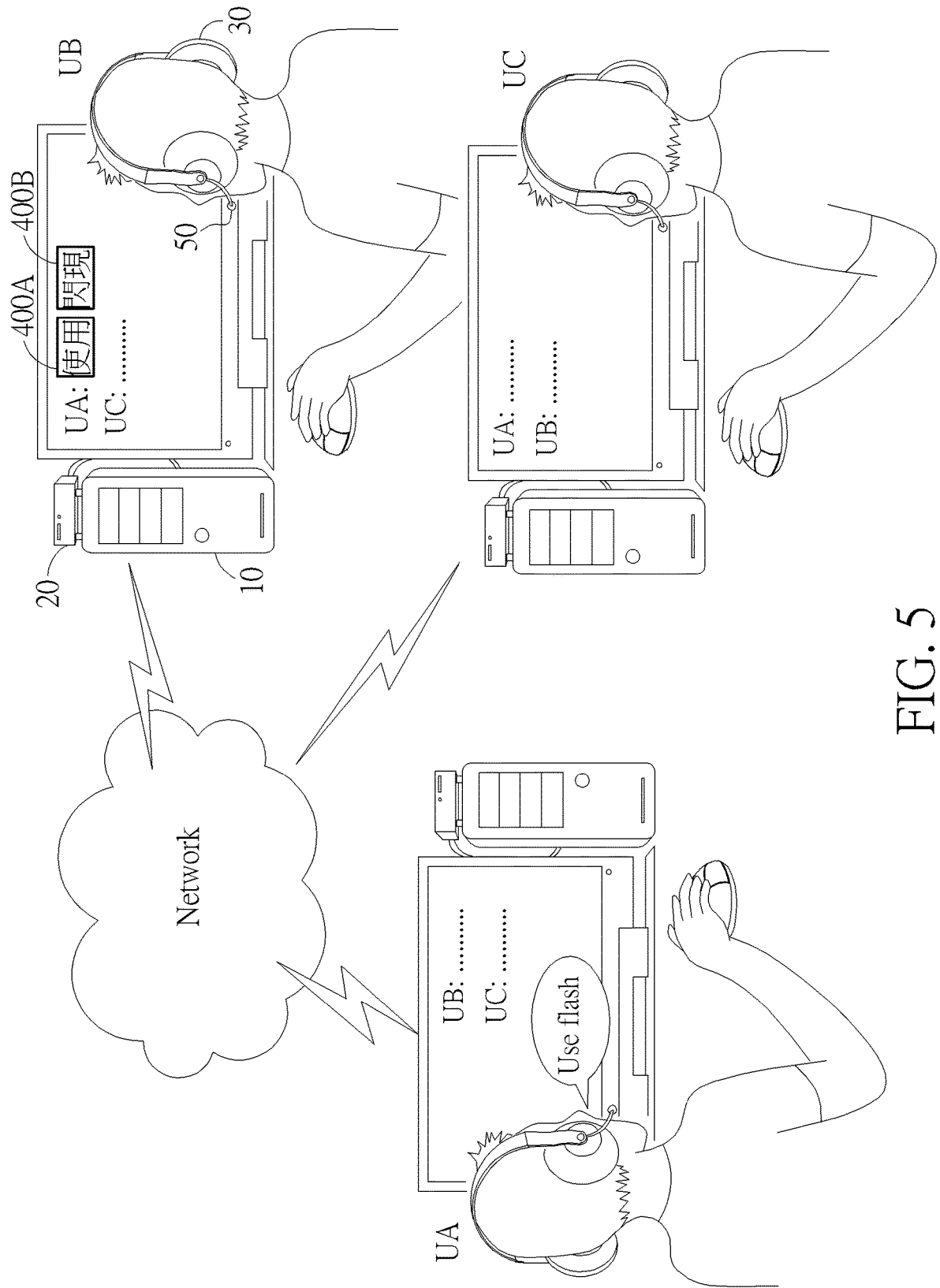
FIG. 5 to FIG. 7 are schematic diagrams of the electronic system applied for an online game according to exemplary embodiments of the invention respectively.

Please refer to FIG. 5. FIG. 5 is a schematic diagram of the electronic system 1 applied for an online game according to an exemplary embodiment of the invention. The user UA can speak English, and can hear and understand English. The user UB can speak Chinese, and can hear and understand Chinese. The user UC can speak German, and can hear and understand German. As shown in FIG. 5, the users UA, UB and UC are utilizing their electronic systems to implement the first application program (e.g., League of Legends game software) for playing League of Legends online game, respectively. For example, the user UB utilizes the electronic system 1 of the invention to implement the first application program. When playing the League of Legends online game, the user UA says "use flash" in English and the corresponding analog speech signal of English is generated and transmitted to the electronic system 1 utilized by the user UB through the network. The electronic system 1 utilized by the user UB converts the analog speech signal of English in to speech data $S_{REMOTE}$ (digital data) of English. Since the host 10 is currently implementing the first application program, the smart interpreter engine 200 converts the speech data "flash" of English into Chinese words "閃現" (Chinese characters) after querying the text database 2012. Moreover, the smart interpreter engine 200 converts the speech data "use" of English into Chinese words "使用" (Chinese characters) after querying the text database 2012. Therefore, as shown in FIG. 5, the user UB can hear the spoken words "use flash" in English played by the audio output device 30 based on the analog speech data $S_{REMOTE}$. A display area 400A of the display 40 shows the Chinese words "使用" in Chinese characters. A display area 400B of the display 40 shows the Chinese words "閃 現" in Chinese characters. As a result, although the user UB does not understand English and does hear the analog speech data $S_{REMOTE'}$ (i.e. the spoken words "use flash") of English played by the audio output device 30, the user UB can still understand and perceive what the information conveyed by the user UA while seeing the Chinese words "使用閃現" in Chinese characters displayed on the display 40. Therefore, the electronic system 1 can not only convert the speech data into text data, but also provide flexible glossary translation for different application situations, so as to meet player's demands and increase player immersion in the esports game.

Figure 6:
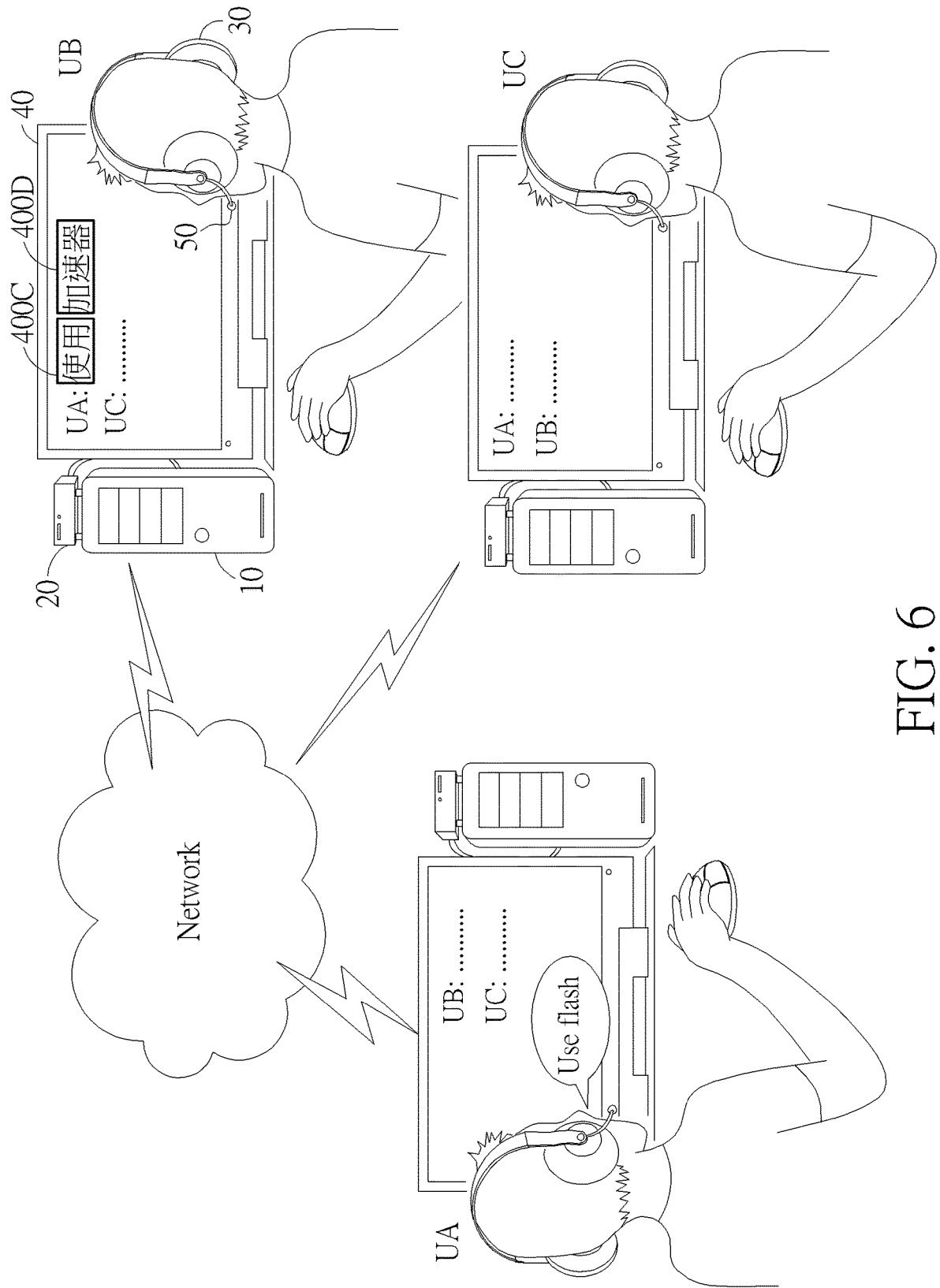

Please refer to FIG. 6. FIG. 6 is a schematic diagram of the electronic system 1 applied for an online game according to an alternative exemplary embodiment of the invention. The user UA can speak English, and can hear and understand English. The user UB can speak Chinese, and can hear and understand Chinese. The user UC can speak German, and can hear and understand German. As shown in FIG. 6, the users UA, UB and UC are utilizing their electronic systems to implement the second application program (e.g., Minecraft game software) for playing Minecraft online game, respectively. For example, the user UB utilizes the electronic system 1 of the invention to implement the second application program. When playing the Minecraft online game, the user UA says "use flash" in English and the corresponding analog speech signal of English is generated and transmitted to the electronic system 1 utilized by the user UB through the network. The electronic system 1 utilized by the user UB converts the analog speech signal of English in to speech data $S_{REMOTE}$ (digital data) of English. Since the host 10 is currently implementing the second application program, the smart interpreter engine 200 converts the speech data "flash" of English into Chinese words "加速器" (Chinese characters) after querying the text database 2012. Moreover, the smart interpreter engine 200 converts the speech data "use" of English into Chinese words "使用" (Chinese characters) after querying the text database 2012. Therefore, as shown in FIG. 6, the user UB can hear the spoken words "use flash" in English played by the audio output device 30 based on the analog speech data $S_{REMOTE'}$. A display area 400C of the display 40 shows Chinese words "使用" in Chinese characters. A display area 400D of the display 40 shows Chinese words "加速器" in Chinese characters. As a result, although the user UB does not understand English and does hear the analog speech data $S_{REMOTE'}$ (i.e. the spoken words "use flash") of English played by the audio output device 30, the user UB can still understand and perceive what the information conveyed by the user UA while seeing the Chinese words "使用加速器" in Chinese characters displayed on the display 40.

Please further refer to FIG. 4. When the electronic system 1 operates in the second operation mode (capturing mode), the audio engine 202 converts the analog speech signal $S_{LO}$ corresponding to the first language into speech data $S_{LO'}$ corresponding to the first language and transmits the speech data $S_{LO'}$ corresponding to the first language to the smart interpreter engine 200. Further, the noise suppression module 2000 performs a noise suppression process on the speech data $S_{LO'}$ corresponding to the first language for reducing noise component in the speech data. The vocal identification module 2002 performs a vocal identification process on the noise-suppressed speech data $S_{LO'}$ corresponding to the first language to generate vocal identification data corresponding to the first language. The speech to text converter 2004 converts the vocal identification data corresponding to the first language into text data corresponding to the first language. As mentioned above, The NLP module 2006 can convert the text data corresponding to the first language into glossary text data corresponding to the first language. The translator 2008 converts the glossary text data corresponding to the first language into text data corresponding to a second language. After that, the text to speech converter 2010 converts the text data corresponding to the second language into the speech data $S_{LO\_O}$ corresponding to the second language. After that, the smart interpreter engine 200 transmits the speech data $S_{LO\_O}$ corresponding to the second language to the host 10. The host provides the speech data $S_{LO\_O}$ corresponding to the second language to the external devices. Under such a situation, when a user familiar with the second language is using the external device, the user can understand and perceive the information conveyed by the user of the electronic system 1 after hearing the speech data $S_{LO\_O}$ corresponding to the second language outputted by the electronic system 1.

Figure 7:
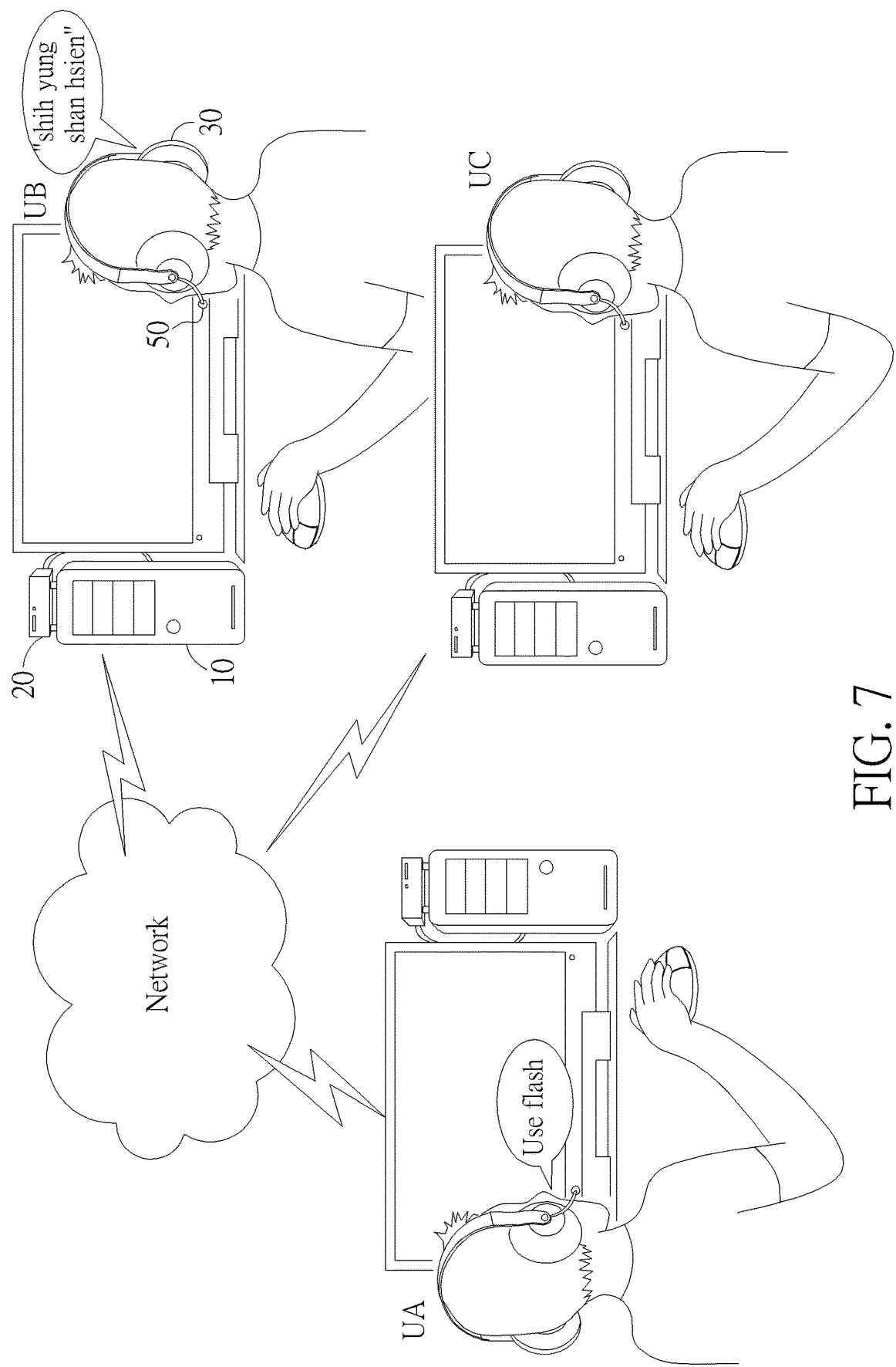

Please refer to FIG. 7. FIG. 7 is a schematic diagram of the electronic system 1 applied for an online game according to an alternative exemplary embodiment of the invention. The user UA can speak English, and can hear and understand English. The user UB can speak Chinese, and can hear and understand Chinese. The user UC can speak German, and can hear and understand German. As shown in FIG. 7, the users UA, UB and UC are utilizing their electronic systems to implement the first application program (e.g., League of Legends game software) for playing League of Legends online game, respectively. For example, the user UA utilizes the electronic system 1 of the invention to implement the first application program. When playing the League of Legends online game, the user UA says "use flash" in English and the corresponding analog speech signal of English is generated. The audio engine 202 of the electronic system 1 utilized by the user UA converts the analog speech signal of English into digital speech data of English. Since the host 10 is currently implementing the first application program, the smart interpreter engine 200 converts the speech data "use flash" of English into speech data "使用閃現" (i.e. "shih yung shan hsien" in Romanized form) of Chinese and provides the converted speech data of Chinese to the user UB. As a result, the user can understand and perceive what the information conveyed by the user UA while hearing the speech data "使用閃現" (i.e. "shih yung shan hsien" in Romanized form) of Chinese.

In summary, the embodiments of the invention provide the user utilizing the electronic system 1 to hear the analog speech data corresponding to the first language played by the audio output device 30 and see the text data displayed by the display 40. Under such a situation, even the user does not understand the analog speech data corresponding to the first language, the user can understand and perceive what the information conveyed by the speech data corresponding to the first language while seeing the text data corresponding to the second language displayed by the display 40. Besides, the embodiments of the invention can convert the analog speech data inputted by the user corresponding to the first language into speech data corresponding to a second language, so as to allow other user can understand what the user utilizing the electronic system 1 conveys. Moreover, the embodiments of the invention can acquire audio data in game and submit audio data to a smart interpreter engine for vocal identification and neural machine translation so as to facilitate the user to easy understand what the other user conveys. As such, the embodiments of the invention can bring good interaction between users using different languages and effectively improve the user experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A smart interpreter engine, comprising:
a speech to text converter, for converting speech data corresponding to a first language into text data corresponding to the first language;
a natural language processing module, for converting the text data corresponding to the first language into glossary text data corresponding to the first language according to a game software being executed in a host; and
a translator, for converting the glossary text data corresponding to the first language into text data corresponding to a second language.

2. The smart interpreter engine of claim 1, wherein when the game software being executed in the host is a first game software, the smart interpreter engine converts the speech data corresponding to the first language into a first text data corresponding to the second language; and when the game software being executed in the host is a second game software different from the first game software, the smart interpreter engine converts the speech data corresponding to the first language into a second text data corresponding to the second language.

3. The smart interpreter engine of claim 2, wherein when the game software being executed in the host is the first game software, the natural language processing module converts the text data corresponding to the first language into a first glossary text data corresponding to the first language and the translator converts the first glossary text data corresponding to the first language into the first text data corresponding to the second language; and when the game software being executed in the host is the second game software, the natural language processing module converts the text data corresponding to the first language into a second glossary text data corresponding to the first language and the translator converts the second glossary text data corresponding to the first language into the second text data corresponding to the second language.

4. The smart interpreter engine of claim 1, further comprising:
a text database, comprising a plurality of text samples corresponding to the first language and a plurality of game software and a plurality of glossary texts corresponding to the text samples;
wherein the natural language processing module queries the text database to determine the glossary text data corresponding to the first language according to the game software being executed in the host and the text data corresponding to the first language.

5. The smart interpreter engine of claim 4, wherein when at least one word of the text data corresponding to the first language matches a first text sample of the plurality of text samples and the game software being executed in the host matches a first game software corresponding to the first text sample, the natural language processing module converts the at least one word of the text data corresponding to the first language into a first glossary text corresponding to the first text sample; and when the at least one word of the text data corresponding to the first language matches a second text sample of the plurality of text samples and the game software being executed in the host matches a second game software different from the first software and corresponding to the second text sample, the natural language processing module converts the at least one word of the text data corresponding to the first language into a second glossary text corresponding to the first text sample.

6. The smart interpreter engine of claim 1, further comprising:
a noise suppression module, for performing a noise suppression process on the speech data corresponding to the first language; and
a vocal identification module, for performing a vocal identification process on the noise-suppressed speech data corresponding to the first language to generate vocal identification data corresponding to the first language, such that the speech to text converter converts the vocal identification data corresponding to the first language into the text data corresponding to the first language.

7. The smart interpreter engine of claim 1, further comprising:
a text to speech converter, for converting text data corresponding to the second language into speech data corresponding to the second language.

8. The smart interpreter engine of claim 1, wherein the smart interpreter engine transmits the text data corresponding to the second language to a display device for displaying.

9. An electronic system, comprising:
a host, for obtaining speech data corresponding to a first language; and
a smart interpreter engine, comprising:
a speech to text converter, for converting the speech data corresponding to the first language into text data corresponding to the first language;
a natural language processing module, for converting the text data corresponding to the first language into glossary text data corresponding to the first language according to a game software being executed in the host; and
a translator, for converting the glossary text data corresponding to the first language into text data corresponding to a second language.

10. The electronic system of claim 9, wherein the host comprises:
an audio engine, for acquiring the speech data corresponding to the first language from audio streams processed by the game software being executed in the host.

11. The electronic system of claim 9, wherein the host comprises:
an audio input device, for acquiring speech sounds of current environment to generate the speech signal corresponding to the first language.

12. The electronic system of claim 9, wherein when the game software being executed in the host is a first game software, the smart interpreter engine converts the speech data corresponding to the first language into a first text data corresponding to the second language; and when the game software being executed in the host is a second game software different from the first game software, the smart interpreter engine converts the speech data corresponding to the first language into a second text data corresponding to the second language.

13. The electronic system of claim 12, wherein when the game software being executed in the host is the first game software, the natural language processing module converts the text data corresponding to the first language into a first glossary text data corresponding to the first language and the translator converts the first glossary text data corresponding to the first language into the first text data corresponding to the second language; and when the game software being executed in the host is the second game software, the natural language processing module converts the text data corresponding to the first language into a second glossary text data corresponding to the first language and the translator converts the second glossary text data corresponding to the first language into the second text data corresponding to the second language.

14. The electronic system of claim 9, wherein the smart interpreter engine further comprises:
   a text database, comprising a plurality of text samples corresponding to the first language and a plurality of game software and a plurality of glossary texts corresponding to the text samples;
   wherein the natural language processing module queries the text database to determine the glossary text data corresponding to the first language according to the game software being executed in the host and the text data corresponding to the first language.

15. The electronic system of claim 14, wherein when at least one word of the text data corresponding to the first language matches a first text sample of the plurality of text samples and the game software being executed in the host matches a first game software corresponding to the first text sample, the natural language processing module converts the at least one word of the text data corresponding to the first language into a first glossary text corresponding to the first text sample; and when the at least one word of the text data corresponding to the first language matches a second text sample of the plurality of text samples and the game software being executed in the host matches a second game software different from the first software and corresponding to the second text sample, the natural language processing module converts the at least one word of the text data corresponding to the first language into a second glossary text corresponding to the first text sample.

16. The electronic system of claim 9, wherein the smart interpreter engine further comprises:
   a noise suppression module, for performing a noise suppression process on the speech data corresponding to the first language; and
   a vocal identification module, for performing a vocal identification process on the noise-suppressed speech data corresponding to the first language to generate vocal identification data corresponding to the first language, such that the speech to text converter converts the vocal identification data corresponding to the first language into the text data corresponding to the first language.

17. The electronic system of claim 9, wherein the smart interpreter engine further comprises:
   a text to speech converter, for converting text data corresponding to the second language into speech data corresponding to the second language.

18. The electronic system of claim 9, further comprising:
   a display, for displaying the text data corresponding to the second language.

19. The electronic system of claim 9, further comprising:
   an audio output device, for playing the speech signal corresponding to the first language.

* * * * *